(12) United States Patent
Chen

(10) Patent No.: US 11,259,201 B2
(45) Date of Patent: Feb. 22, 2022

(54) REFERENCE SIGNAL MEASUREMENT METHOD AND USER TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATIONS CO., LTD., Guangdong (CN)

( * ) Notice: Subject to any disclaimer, the term of this patent is extended or adjusted under 35 U.S.C. 154(b) by 0 days.

(21) Appl. No.: 16/961,754

(22) PCT Filed: Jan. 10, 2019

(86) PCT No.: PCT/CN2019/071138
§ 371 (c)(1),
(2) Date: Jul. 13, 2020

(87) PCT Pub. No.: WO2019/137424
PCT Pub. Date: Jul. 18, 2019

(65) Prior Publication Data
US 2021/0067994 A1  Mar. 4, 2021

(30) Foreign Application Priority Data
Jan. 11, 2018 (CN) .......................... 201810027696.5

(51) Int. Cl.
*H04W 24/10* (2009.01)
*H04L 5/00* (2006.01)

(52) U.S. Cl.
CPC ............ *H04W 24/10* (2013.01); *H04L 5/005* (2013.01); *H04L 5/0051* (2013.01); *H04L 5/0094* (2013.01)

(58) Field of Classification Search
CPC ..... H04W 24/10; H04W 48/12; H04W 76/30; H04W 76/20; H04W 76/40; H04W 48/16;
(Continued)

(56) References Cited

U.S. PATENT DOCUMENTS

2012/0213108 A1  8/2012  Ji et al.
2013/0003648 A1*  1/2013  Hahn ................... H04W 88/04
                                                         370/315
(Continued)

FOREIGN PATENT DOCUMENTS

CN  103228015 A  7/2013
CN  103491523 A  1/2014
(Continued)

OTHER PUBLICATIONS

Extended European Search Report dated Feb. 2, 2021 issued in PCT/CN2019/071138.
(Continued)

*Primary Examiner* — Thai Nguyen
(74) *Attorney, Agent, or Firm* — Gearhart Law LLC; David Postolski, Esq.

(57) ABSTRACT

Embodiments of the present disclosure provide a reference signal measurement method and a user terminal. The method includes: obtaining configuration information, where the configuration information is configured to configure a specific reference signal; measuring the specific reference signal according to the configuration information in an idle state or an inactive state.

17 Claims, 7 Drawing Sheets

(58) Field of Classification Search
CPC .. H04W 76/27; H04W 28/0236; H04L 5/005; H04L 5/0051; H04L 5/0094; H04L 5/0048; H04L 5/006
See application file for complete search history.

(56) References Cited

U.S. PATENT DOCUMENTS

| | | | |
|---|---|---|---|
| 2016/0095008 A1* | 3/2016 | Zhao | H04W 24/08 370/252 |
| 2017/0195906 A1 | 7/2017 | Dalsgaard et al. | |
| 2017/0223558 A1 | 8/2017 | Deng et al. | |
| 2017/0280334 A1 | 9/2017 | Chou | |
| 2018/0097678 A1 | 4/2018 | Zhou et al. | |

FOREIGN PATENT DOCUMENTS

| | | |
|---|---|---|
| CN | 103563267 A | 2/2014 |
| CN | 103581989 A | 2/2014 |
| CN | 105338566 A | 2/2016 |
| CN | 106465171 A | 2/2017 |
| CN | 106788931 A | 5/2017 |
| CN | 106793169 A | 5/2017 |
| EP | 2624621 A1 | 7/2013 |
| EP | 2999264 A1 | 3/2016 |
| WO | 2014198013 A1 | 12/2014 |

OTHER PUBLICATIONS

3GPP TSG RAN WG1 Meeting #90bis; R1-1717932; Prague, Czech Republic Oct. 9-13, 2017; "Remaining details on L3 measurement and mobility management"; 12 pages.
3GPP TSG-RAN WG2 #96; Tdoc R2-168726; Reno, Nevada, USA, Nov. 14-18, 2016; "Beam forming of idle and connected mode signals"; 6 pages.
3GPP TSG-RAN WG2 #99-bis on NR; Tdoc R2-1710444; Prague, Czech, Oct. 9-13, 2017 (resubmission of R2-1708579); "Cell quality derivation for idle/inactive UEs", 4 pages.
First Office Action dated May 18, 2020 issued in Chinese Application No. 201810027696.5.
International Preliminary Report on Patentability and Written Opinion dated Jul. 23, 2020 issued in PCT/CN2019/071138.

* cited by examiner base station user terminal

REFERENCE SIGNAL MEASUREMENT METHOD AND USER TERMINAL

CROSS-REFERENCE TO RELATED APPLICATION

This application is the U.S. national phase of PCT Application PCT/CN2019/071138 filed on Jan. 10, 2019, which claims the benefit and priority of Chinese Application No. 201810027696.5, filed on Jan. 11, 2018, which is incorporated herein by reference in its entirety

TECHNICAL FIELD

The present disclosure relates to the field of communication technologies, and in particular to a reference signal measurement method and a user terminal.

BACKGROUND

In the current communication system, in addition to an RRC idle state and an RRC connected state, states of a user terminal further include a new RRC inactive state. In addition, at present, when the user terminal is in the idle state or the inactive state, the user terminal will only measure a non-specific synchronization signal block (SSB) to obtain a measurement result including synchronization signal and path loss information, thereby performing mobility management in the idle state or the inactive state according to the measurement result, such as cell selection, cell reselection or cell residence. However, since the user terminal in the idle state or the inactive state only measures the SSB, the speed at which the user terminal resumes the connection is relatively slow.

SUMMARY

Embodiments of the present disclosure provide a reference signal measurement method and a user terminal, which can solve the problem that the speed at which the user terminal resumes the connection is relatively slow.

In order to solve the above technical problem, the present disclosure is implemented as follows. A reference signal measurement method, applied to a user terminal, including:

obtaining configuration information, wherein the configuration information is configured to configure a specific reference signal;

measuring the specific reference signal according to the configuration information in an idle state or an inactive state.

In a first aspect, one embodiment of the present disclosure provides a reference signal measurement method, applied to a user terminal, including:

obtaining configuration information, wherein the configuration information is configured to configure a specific reference signal;

measuring the specific reference signal according to the configuration information in an idle state or an inactive state.

In a second aspect, one embodiment of the present disclosure provides a reference signal measurement method, applied to a base station, including:

generating configuration information, where the configuration information is configured to configure a specific reference signal;

transmitting the configuration information to the user terminal, so that the user terminal in an idle state or an inactive state measures the specific reference signal according to the configuration information.

In a third aspect, one embodiment of the present disclosure provides a user terminal, including:

an obtaining module configured to obtain configuration information, wherein the configuration information is configured to configure a specific reference signal;

a measurement module configured to measure the specific reference signal according to the configuration information in an idle state or an inactive state.

In a fourth aspect, one embodiment of the present disclosure provides a base station, including:

a generation module configured to generate configuration information, where the configuration information is configured to configure a specific reference signal;

a transmission module configured to transmit the configuration information to the user terminal, so that the user terminal in an idle state or an inactive state measures the specific reference signal according to the configuration information.

In a fifth aspect, one embodiment of the present disclosure provides a user terminal, including: a memory, a processor, and a computer program stored on the memory and executable on the processor; wherein the computer program is executed by the processor to implement steps of the reference signal measurement method at the user terminal.

In a sixth aspect, one embodiment of the present disclosure provides a base station, including: a memory, a processor, and a computer program stored on the memory and executable on the processor; wherein the computer program is executed by the processor to implement steps of the reference signal measurement method at the base station.

In a seventh aspect, one embodiment of the present disclosure provides a computer readable storage medium, including a computer program stored thereon; wherein the computer program is executed by a processor to implement steps of the reference signal measurement method at the user terminal, or the computer program is executed by the processor to implement steps of the reference signal measurement method at the base station.

In this way, in one embodiment of the present disclosure, the configuration information is obtained, where the configuration information is configured to configure the specific reference signal; the specific reference signal is measured by the user terminal in the idle state or the inactive state according to the configuration information. Since the specific reference signal is measured by the user terminal in the idle state or the inactive state, the speed at which the user terminal resumes the connection can be increased as compared with that the user terminal in the idle state or inactive state measures only non-specific SSB in the related art.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions in embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
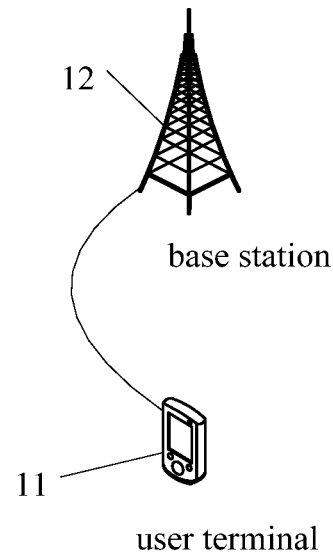
FIG. 1 is a schematic diagram of a reference signal measurement system according to an embodiment of the present disclosure.

Referring to FIG. 1, FIG. 1 is a schematic diagram of a reference signal measurement system according to an embodiment of the present disclosure. As shown in FIG. 1, the reference signal measurement system includes a user terminal 11 and a base station 12. The user terminal 11 may be a user equipment (UE), such as a mobile phone, a tablet personal computer, a laptop computer, a personal digital assistant (PDA), a mobile Internet device (MID), a wearable device or other terminal device. It should be noted that the specific type of the user terminal 11 is not limited in the embodiment of the present disclosure. The base station 12 may be a base station in a 5G network (such as gNB, 5G NR NB). The base station 12 may also be a base station in a 4G network (such as eNB, eLTE NB). It should be noted that the specific type of the base station 12 is not limited in the embodiment of the present disclosure.

Figure 2:
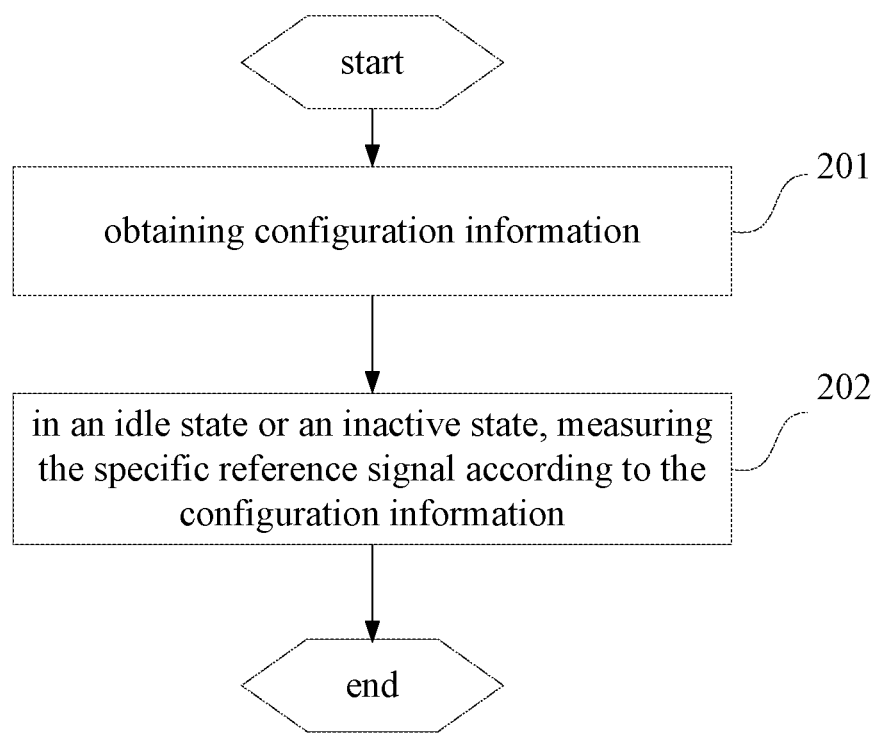
FIG. 2 is a flowchart of a reference signal measurement method according to an embodiment of the present disclosure.

Referring to FIG. 2, FIG. 2 is a flowchart of a reference signal measurement method according to an embodiment of the present disclosure. The method is applied to a user terminal. As shown in FIG. 2, the method includes the following steps.

Step 201: obtaining configuration information, where the configuration information is configured to configure a specific reference signal.

The obtaining configuration information may include: receiving, by the user terminal, configuration information transmitted by a base station, when the user terminal transits from a connected state to an idle state or an inactive state; or, receiving, by the user terminal, configuration information transmitted by a base station, when the terminal is in an connected state; or, receiving, by the user terminal, configuration information transmitted by a base station, during a random access process; or, obtaining, by the user terminal, pre-stored configuration information, etc., which is not limited in the embodiments of the present disclosure.

The foregoing configuration information configured to configure a specific reference signal may means that the configuration information is configured to configure one or more specific reference signals for the user terminal in an idle state or an inactive state. The specific reference signal may include a UE specific reference signal, or may include a cell specific reference signal. The UE specific reference signal may be a reference signal corresponding to the user terminal, or, a reference signal corresponding to a group in which the user terminal is located. Different user terminals may correspond to different specific reference signals, or different specific reference signals corresponding to different user terminal groups. The cell specific reference signal may be a reference signal corresponding to a cell.

Step 202: in an idle state or an inactive state, measuring the specific reference signal according to the configuration information.

The measuring the specific reference signal according to the configuration information may include: measuring the specific reference signal configured by the configuration information to obtain a corresponding measurement result.

Through the above steps, the user terminal in the idle state or the inactive state can measure the specific reference signal, so that the user terminal in the idle state or the inactive state can measure more reference signals. In this way, the user terminal can increase the speed at which the user terminal resumes the connection. This is because, in the current communication system, the user terminal in the idle state or the inactive state only measures non-specific SSB, and the specific reference signal is measured by the user terminal in the connected state. Thus, the user terminal in the idle state or the inactive state can complete the task of measuring the specific reference signal that is originally performed in the connected state, thereby increasing the speed at which the user terminal resumes the connection.

The above method may be applied to a 5G system, but is not limited thereto. As long as substantially the same functions can be realized, the above method may be applied to other communication systems, such as a 4G system, a 6G system or communication system using system information blocks.

In this way, in one embodiment of the present disclosure, the configuration information is obtained, where the configuration information is configured to configure the specific reference signal; the specific reference signal is measured by the user terminal in the idle state or the inactive state according to the configuration information. Since the specific reference signal is measured by the user terminal in the idle state or the inactive state, the speed at which the user terminal resumes the connection can be increased as compared with that the user terminal in the idle state or inactive state measures only non-specific SSB in the related art.

Figure 3:
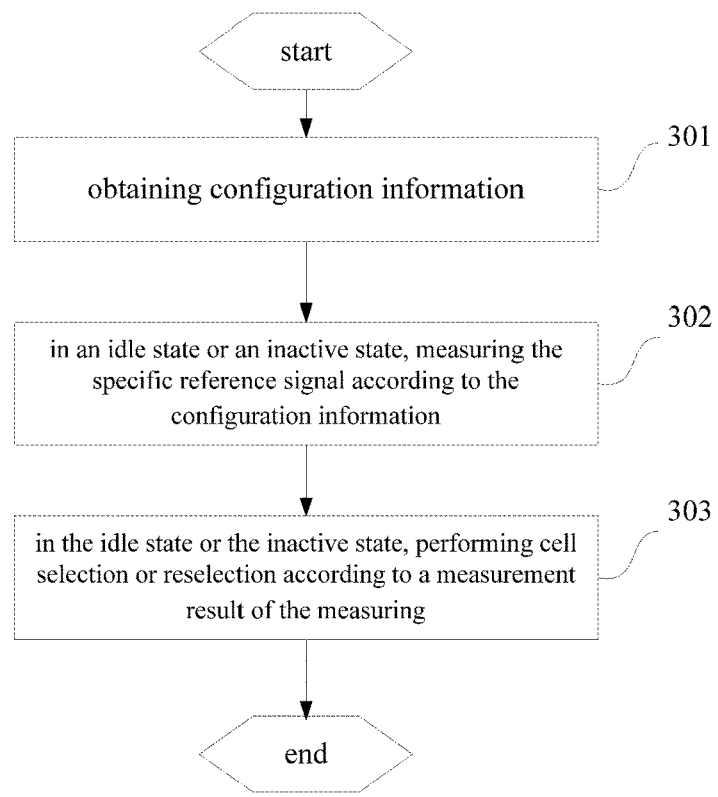
FIG. 3 is another flowchart of a reference signal measurement method according to an embodiment of the present disclosure.

Referring to FIG. 3, FIG. 3 is another flowchart of a reference signal measurement method according to an embodiment of the present disclosure. The method is applied to a user terminal. As shown in FIG. 3, the method includes the following steps.

Step 301: obtaining configuration information, where the configuration information is configured to configure a specific reference signal.

The configuration information may configure a specific reference signal that needs to be measured for a local cell, and may also configure a specific reference signal that needs to be measured for a neighboring cell. For example, the specific reference signal may include at least one of the following:

a specific reference signal configured for a local cell and a specific reference signal configured for a neighboring cell;

where the specific reference signal configured for the local cell includes at least one of a UE specific reference signal configured for the local cell and a cell specific reference signal configured for the local cell;

the specific reference signal configured for the neighboring cell includes at least one of a UE specific reference signal configured for the neighboring cell and a cell specific reference signal configured for the neighboring cell.

In one embodiment of the present disclosure, the local cell may refer to a cell on which a user terminal in an idle state camps, a cell to which a user terminal in a connected state is connected, or a cell to which a user terminal in an inactive state is connected when it transits from the connected state to the inactive state.

The neighboring cell may refer to at least one of the following: a cell adjacent to the local cell, a cell in a neighboring cell list carried in system information (SI) of the local cell, a cell in a cell list carried in the SI of the local cell, other cell configured by the local cell for the user terminal to measure, a cell in which the user terminal reads system information of non-local cell, and a cell in which the user terminal reads a synchronization signal of non-local cell.

In addition, the specific reference signal configured for the local cell and the specific reference signal configured for the neighboring cell may be the same, or different, or partially the same, and the like, which is not limited in the embodiments of the present disclosure.

The configuration information may configure a specific reference signal for at least one of the local cell and the neighboring cell, thus the user terminal in the idle state or the inactive state may measure more reference signals, thereby improving measurement performance of the user terminal in the idle state or the inactive state, and then further increasing the speed at which the user terminal resumes the connection.

In addition, in one embodiment, the UE specific reference signal may include at least one of the following:

a UE specific SSB, a UE specific channel state information reference signal (CSI-RS), a UE specific demodulation reference signal (DMRS), and other UE specific reference signals.

The other specific reference signals may be specific reference signals other than the specific SSB, the specific CSI-RS and the specific DMRS, for example, a newly defined specific reference signal in the 5G system.

Of course, the cell specific reference signal may also include at least one of a cell specific SSB, a cell specific CSI-RS, a cell specific DMRS, and other cell specific reference signals.

The specific SSB, the specific CSI-RS, the specific DMRS and other specific reference signals can allow the user terminal in the idle state or the inactive state to measure more reference signals, and the specific SSB, the specific CSI-RS and the specific DMRS can reflect path loss information, and thus, the measurement result can be used as a reference for quick resume, which is convenient for the user terminal to quickly resume the connection.

In an optional implementation manner, the obtaining configuration information includes at least one of the following:

receiving configuration information that is transmitted by a base station of a local cell through a radio resource control (RRC) message;

receiving configuration information that is transmitted by the base station of the local cell by a broadcast message; and receiving configuration information that is transmitted by a base station of a neighboring cell by a broadcast message.

The configuration information transmitted through the RRC message and the broadcast message of the local cell may be configured to configure a specific reference signal for the local cell, or configure a specific reference signal for the neighboring cell, or may be configured to configure a specific reference signal for the local cell as well as configure a specific reference signal for the neighboring cell. The configuration information transmitted through the broadcast message of the neighboring cell may be configured to configure a specific reference signal for the neighboring cell.

In addition, an RRC message may be used to configure a specific reference signal for the local cell, and another RRC message may be used to configure a specific reference signal for the neighboring cell. The RRC message for configuring the specific reference signal for the neighboring cell may carry the above configuration information in a container included in the RRC message. The base station of the local cell issues the RRC message of the local cell or transparently transmits the RRC message of the neighboring cell, and thus the overhead of the user terminal for receiving downlink messages can be saved, and the user terminal can receive in the local cell the configuration information for configuring the specific reference signal for the neighboring cell. Certainly, an identical RRC message may be configured to configure the specific reference signal for the local cell as well as configure the specific reference signal for the neighboring cell.

Similarly, a broadcast message may be used to configure a specific reference signal for the local cell, and another broadcast message may be used to configure a specific reference signal for the neighboring cell. In this way, the user terminal can obtain the configuration information for configuring the specific reference signal for the neighboring cell by reading the broadcast message of the local cell.

In this implementation manner, since the configuration information may be transmitted to the user terminal through the RRC message or the broadcast message, the flexibility of the communication system can be improved. Further, a specific reference signal can be configured for the neighboring cell in the local cell, thereby reducing the movement of the user terminal and then saving power consumption of the user terminal.

Optionally, the foregoing RRC message may include:

a release message, a suspend message, a reconfiguration message, a configuration message in a connected state, a downlink message in random access channel (RACH) procedure, or a dedicated RRC message scrambled by radio network temporary identifier (RNTI).

For example, when the user terminal is released from the connected state to the idle state or the inactive state, the base station may use a release message or a suspend message to carry the configuration information, thereby avoiding generation of an additional message and then saving transmission resources.

For another example, the base station may configure the configuration information to the user terminal through a reconfiguration message. Further, when the user terminal performs a resume, a reconfiguration message is transmitted to the user terminal.

For another example, after the user terminal accesses the network, the base station configures for the user terminal a specific reference signal, which is still valid after the user terminal is released from the connected state to the idle state or the inactive state, thereby avoiding transmitting configuration messages to the user terminal for multiple times and then saving transmission resources.

For another example, the base station may transmit a reconfiguration message to the user terminal through msg.2, msg.4 or a RACH complete message in the RACH procedure, thereby avoiding generation of an additional message and then saving transmission resources.

In addition, the above dedicated RRC message scrambled by the RNTI may be an RRC message other than the RRC message listed above. The dedicated RRC message scrambled by the RNTI may be a dedicated RRC message scrambled by a cell radio network temporary identifier (C-RNTI), a group radio network temporary identifier (Group RNTI) or an inactive radio network temporary identifier (I-RNTI).

In addition, the foregoing broadcast message may include an identifier of the user terminal or an identifier of a group in which the user terminal is located. In this way, the user terminal may determine that the configuration information is transmitted to the user terminal through the identifier, thereby preventing an error from occurring.

As an optional implementation manner, the obtaining configuration information includes:

in an inactive state, obtaining configuration information that is received by the user terminal in a connected state; or, in an idle state, obtaining configuration information that is received by the user terminal in the inactive state or the connected state.

In this implementation manner, the configuration information that is received by the user terminal in the connected state, can be directly used by the user terminal in the inactive state. For example, a UE specific reference signal and a cell specific reference signal, which are configured for the user terminal in the connected state, can be directly used by the user terminal in the inactive state, thereby avoiding multiple transmissions of configuration information and then saving transmission resources and power consumption.

In this implementation manner, the configuration information that is received by the user terminal in the inactive state or the connected state, can be directly used by the user terminal in the idle state. For example, a UE specific reference signal and a cell specific reference signal, which are configured for the user terminal in the inactive state or the connected state, can be directly used by the user terminal in the idle state, thereby avoiding multiple transmissions of configuration information and then saving transmission resources and power consumption.

Step 302: in an idle state or an inactive state, measuring the specific reference signal according to the configuration information.

The measuring the specific reference signal may include: measuring the specific reference signal in the local cell, for example, measuring in the local cell a specific reference signal configured for the local cell, or measuring in the local cell a specific reference signal configured for the neighboring cell, or measuring in the neighboring cell a specific reference signal configured for the neighboring cell. In addition, the measuring the specific reference signal may include performing measurement at a specific resource location, for example, measuring a specific reference signal at a specific time domain location, frequency domain location or spatial domain location. The resource locations may be configured through the foregoing configuration information, or may be preset by the user terminal, or may be pre-configured by the base station to the user terminal.

In addition, the measuring the specific reference signal may include measuring measurement performance of the specific reference signal, such as signal strength, signal quality, and received signal power, which is not limited in the embodiments of the present disclosure.

As an optional implementation manner, the configuration information includes at least one of configuration information of the local cell and configuration information of the neighboring cell.

In the idle state or the inactive state, measuring the specific reference signal according to the configuration information, includes at least one of the following:

when the configuration information of the local cell exists, in the idle state or the inactive state, measuring in the local cell a specific reference signal configured by the configuration information of the local cell;

when the configuration information of the neighboring cell exists, in the idle state or the inactive state, measuring in the neighboring cell a specific reference signal configured by the configuration information of the neighboring cell;

when the configuration information of the local cell and the configuration information of the neighboring cell exist and the configuration information of the neighboring cell includes a target specific reference signal that is not in the configuration information of the local cell, measuring in the local cell the target specific reference signal;

when the configuration information of the neighboring cell exists but the configuration information of the local cell does not exist, measuring in the local cell a specific reference signal configured by the configuration information of the neighboring cell.

The configuration information of the local cell may be configured to configure a specific reference signal for the local cell. The configuration information of the neighboring cell may be configured to configure a specific reference signal for the neighboring cell.

In this implementation manner, for the neighboring cell, the reference signal configured for the neighboring cell can be measured, so that which reference signal is configured, which reference signal is measured. For the local cell, the reference signal configured for the local cell and the reference signal configured for the neighboring cell in addition to the reference signal configured for the local cell can be measured. In this way, which reference signal is configured for the local cell, which reference signal is measured; and which reference signal is configured for the neighbor cell, which reference signal is measured in the local cell; thereby enriching the measurement result of the local cell, which is convenient for the user terminal to quickly resume the connection.

Optionally, in this implementation manner, the obtaining configuration information includes:

obtaining measurement object information, where the measurement object information includes the configuration information.

The configuration information included in the measurement target information may include at least one of configuration information of the local cell and configuration information of the neighboring cell.

In this implementation manner, through the measurement object information, the configuration information may be obtained, for example, at least one of configuration information of the local cell and configuration information of the neighboring cell can be obtained. In this way, the user terminal can more clearly determine reference signals to be measured in the local cell and neighboring cells. Of course, the above measurement object information may also be referred to as a measurement object. Of course, the configuration information of the local cell and the configuration information of the neighboring cell may not be determined by the measurement object information. For example, the configuration information transmitted by the base station directly indicates a specific reference signal configured for the local cell and/or a specific reference signal configured for the neighboring cell.

As an optional implementation manner, the foregoing configuration information is further configured to configure measurement performance.

In the idle state or the inactive state, measuring the specific reference signal according to the configuration information includes:

determining measurement performance of at least one of the local cell and the neighboring cell according to the configuration information; and in the idle state or the inactive state, measuring measurement performance of the specific reference signal in at least one of the neighboring cell and the local cell.

In this implementation manner, the base station can configure the measurement performance for the specific reference signal. In this way, the user terminal only needs to measure a corresponding measurement performance for the specific reference signal, thereby eliminating the need to measure all measurement performance and then saving power consumption of the user terminal.

For example, the measurement performance may include at least one of: reference signal receiving power (RSRP), reference signal receiving quality (RSRQ), signal to interference and noise ratio (SINR), received signal strength indicator (RSSI) and channel quality indicator (CQI).

The measurement performances of the local cell and the neighboring cell may be the same, or different, or partially the same. In addition, the measurement performances of different specific reference signals configured for an identical cell may be the same or different. For example, the measurement performance of the specific SSB configured for the local cell includes RSRP and CQI, and the measurement performance of the specific CSI-RS configured for the local cell includes RSRQ and SINR, and the measurement performance of the specific DMRS configured for the neighboring cell includes CQI and SINR, and the like, which is not limited in the embodiments of the present disclosure.

Through the above measurement performance, the measurement result of the user terminal in the idle state or the inactive state can be more abundant, which is convenient for the user terminal to quickly resume the connection.

Of course, the foregoing configuration information may also not be configured with the measurement performance. For example, in the idle state or the inactive state, measuring the specific reference signal according to the configuration information may include:

in the idle state or the inactive state, measuring measurement performance of the specific reference signal in at least one of the neighboring cell and the local cell.

The measurement performance herein may be at least one of RSRP, RSRQ, SINR, RSSI, and CQI. The measurement performances of the local cell and the neighboring cell may be the same, or different, or partially the same. In addition, measurement performances of different specific reference signals configured to an identical cell may also be the same or different.

It should be noted that measuring the specific reference signal of the local cell may include measuring a measurement performance of the specific reference signal configured for the local cell, and may further include measuring a measurement performance of the specific reference signal configured for the neighboring cell. Therefore, which measurement performance is configured for the cell, which measurement performance is measured; and which measurement performance is configured for the neighboring cell, which measurement performance is measured in the local cell. For example, the measurement performance configured by the specific SSB for the local cell includes RSRP and RSRQ, and the measurement performance configured by the specific SSB for the neighboring cell includes RSSI and CQI, then the user terminal can measure the RSRP, RSRQ, RSSI and CQI of the specific SSB when the user terminal measures the specific SSB in the local cell, thereby improving the measurement performance of the local cell.

For the measurement performance of the neighboring cell, the measurement performance configured for the neighboring cell is measured. In this way, for the measurement performance of the neighboring cell, which measurement performance is configured, which measurement performance is measured.

Step 303: in the idle state or the inactive state, performing cell selection or reselection according to a measurement result of the measuring.

The performing cell selection or reselection according to a measurement result of the measuring, may include: determining priorities of cells according to the measurement result of the measuring the specific reference signal, and then performing cell selection or reselection. It should be noted that the implementation manner of cell selection or reselection is not limited in the embodiments of the present disclosure.

Through the step 303, cell selection or reselection can be performed according to the measurement result of the measuring. In this way, the accuracy and efficiency of cell selection or reselection can be improved as compared to measuring only the non-specific SSB.

Of course, in one embodiment, the step 303 is optional. The step 303 may be not performed, instead, the measurement result of the measuring is reported in the connected state. For example, after the step 302, the method may further include:

initiating a RACH procedure according to the measurement result of the measuring to enter a connected state, and reporting the measurement result of the measuring; or, initiating a RACH procedure according to a target event to enter a connected state, and reporting the measurement result of the measuring.

The initiating a RACH procedure according to the measurement result of the measuring to enter a connected state, may be that after the user terminal obtains the foregoing measurement result, the user terminal actively initiates the RACH to enter the connected state, and reports the measurement result. This enables the user terminal to quickly initiate RACH and quickly resume the connection.

The target event may be that after the measurement result is obtained, when there is RACH for subsequent other event (or called purpose) to enter the connected state, the measurement result is reported.

In this implementation manner, after entering the connected state, the foregoing measurement result is reported, so that the measurement result is used for fast connection, or fast activation of the cell, or fast resume or fast recovery, so that the user terminal quickly resumes the connection.

In this embodiment, multiple optional implementation manners are added on the basis of the embodiment shown in FIG. 2, and beneficial effects such as fast recovery of connection and saving transmission resources and power consumption can be realized.

Figure 4:
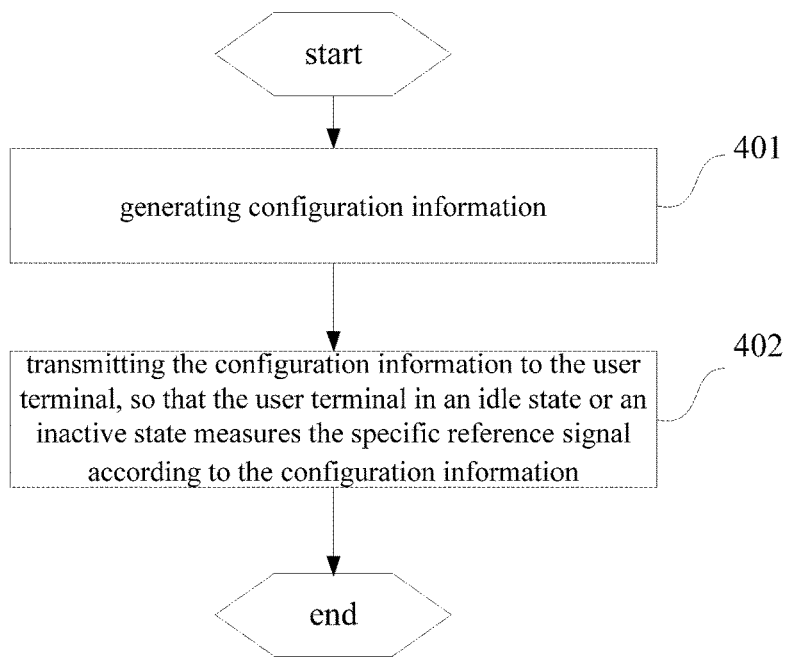
FIG. 4 is another flowchart of a reference signal measurement method according to an embodiment of the present disclosure.

Referring to FIG. 4, FIG. 4 is another flowchart of a reference signal measurement method according to an embodiment of the present disclosure. The method is applied to a base station. As shown in FIG. 4, the method includes the following steps.

Step 401: generating configuration information, where the configuration information is configured to configure a specific reference signal.

Step 402: transmitting the configuration information to the user terminal, so that the user terminal in an idle state or an inactive state measures the specific reference signal according to the configuration information.

Optionally, the specific reference signal includes at least one of the following: a specific reference signal configured for a local cell and a specific reference signal configured for a neighboring cell.

The specific reference signal configured for the local cell includes at least one of a UE specific reference signal configured for the local cell and a cell specific reference signal configured for the local cell.

The specific reference signal configured for the neighboring cell includes at least one of a UE specific reference signal configured for the neighboring cell and a cell specific reference signal configured for the neighboring cell.

Optionally, the UE specific reference signal includes at least one of the following:

a UE specific SSB, a UE specific channel state information reference signal (CSI-RS), a UE specific demodulation reference signal (DMRS), and other UE specific reference signals.

Optionally, the transmitting the configuration information to the user terminal, includes at least one of the following:

transmitting the configuration information to the user terminal through an RRC message;

transmitting the configuration information to the user terminal through a broadcast message.

Optionally, the RRC message may include:

a release message, a suspend message, a reconfiguration message, a configuration message in a connected state, a downlink message in random access channel (RACH) procedure, or a dedicated RRC message scrambled by radio network temporary identifier (RNTI); or, the broadcast message may include an identifier of the user terminal or an identifier of a group in which the user terminal is located.

Optionally, the configuration information is further configured to configure measurement performance, so that the user terminal determines measurement performance of at least one of the local cell and the neighboring cell according to the configuration information, and the user terminal in the idle state or the inactive state measures the measurement performance of the specific reference signal in at least one of the neighboring cell and the local cell.

Optionally, the measurement performance includes at least one of RSRP, RSRQ, SINR, RSSI, and CQI.

Optionally, the transmitting the configuration information to the user terminal, includes:

transmitting measurement object information to the user terminal, where the measurement object information includes the configuration information.

Optionally, after the step of transmitting the configuration information to the user terminal, the method further includes:

receiving a measurement result of the measuring reported by the user terminal in the connected state.

It should be noted that this embodiment is an implementation manner of the base station corresponding to the embodiments shown in FIG. 2 and FIG. 3, and a specific implementation manner thereof can be referred to related descriptions of the embodiments shown in FIG. 2 and FIG. 3, and the same beneficial effects can be achieve. In order to avoid repetitive descriptions, they will not be repeated here.

Figure 5:
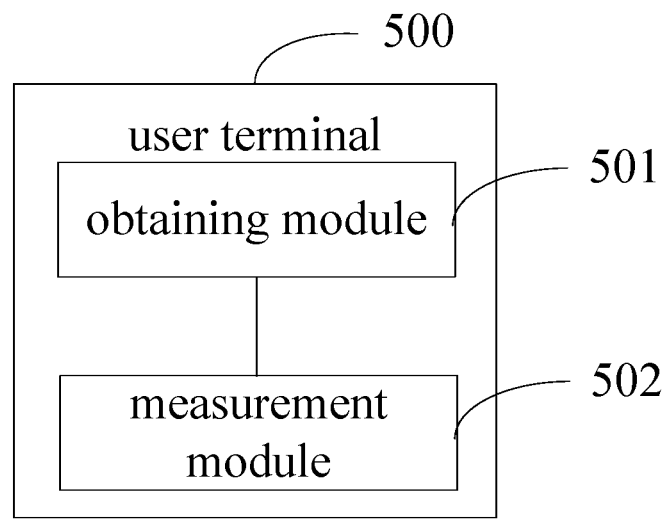
FIG. 5 is a schematic diagram of a user terminal according to an embodiment of the present disclosure.

Referring to FIG. 5, FIG. 5 is a schematic diagram of a user terminal according to an embodiment of the present disclosure. As shown in FIG. 5, the user terminal 500 includes:

an obtaining module 501 configured to obtain configuration information, where the configuration information is configured to configure a specific reference signal;

a measurement module 502 configured to, in an idle state or an inactive state, measure the specific reference signal according to the configuration information.

Optionally, the specific reference signal includes at least one of the following: a specific reference signal configured for a local cell and a specific reference signal configured for a neighboring cell.

The specific reference signal configured for the local cell includes at least one of a UE specific reference signal configured for the local cell and a cell specific reference signal configured for the local cell.

The specific reference signal configured for the neighboring cell includes at least one of a UE specific reference signal configured for the neighboring cell and a cell specific reference signal configured for the neighboring cell.

Optionally, the UE specific reference signal includes at least one of the following:

a UE specific SSB, a UE specific channel state information reference signal (CSI-RS), a UE specific demodulation reference signal (DMRS), and other UE specific reference signals.

Figure 6:
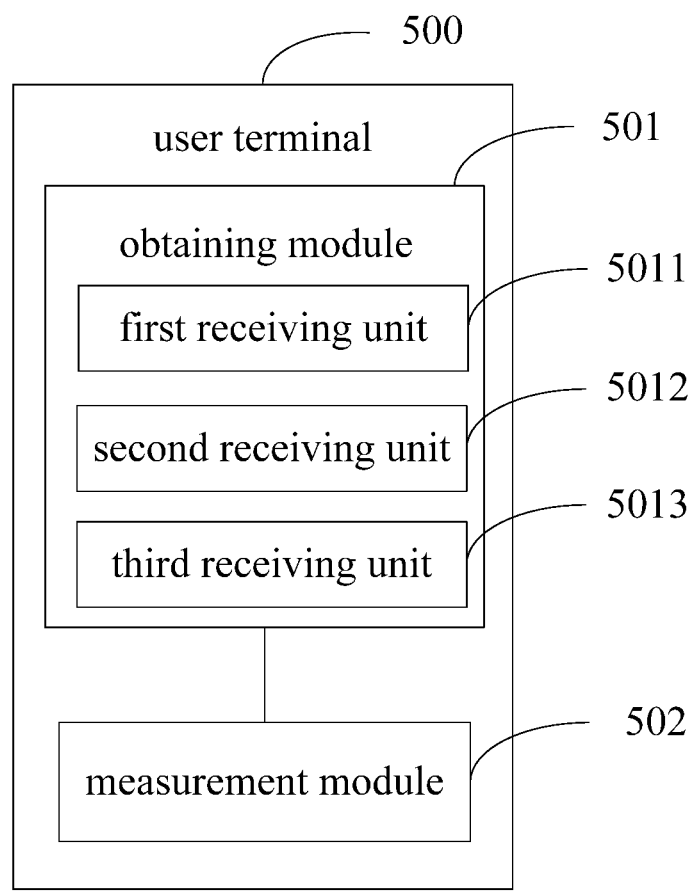
FIG. 6 is another schematic diagram of a user terminal according to an embodiment of the present disclosure.

Optionally, as shown in FIG. 6, the obtaining module 501 includes at least one of the following:

a first receiving unit 5011 configured to receive configuration information that is transmitted by a base station of a local cell through a radio resource control (RRC) message;

a second receiving unit 5012 configured to receive configuration information that is transmitted by the base station of the local cell by a broadcast message; and a third receiving unit 5013 configured to receive configuration information that is transmitted by a base station of a neighboring cell by a broadcast message.

Optionally, the RRC message may include:

a release message, a suspend message, a reconfiguration message, a configuration message in a connected state, a downlink message in random access channel (RACH) procedure, or a dedicated RRC message scrambled by radio network temporary identifier (RNTI); or, the broadcast message may include an identifier of the user terminal or an identifier of a group in which the user terminal is located.

Optionally, the obtaining module 501 is configured to, in an inactive state, obtain configuration information that is received by the user terminal in a connected state; or, the obtaining module 501 is configured to, in an idle state, obtain configuration information that is received by the user terminal in the inactive state or the connected state.

Optionally, the configuration information is further configured to configure measurement performance.

The measurement module 502 is configured to determine measurement performance of at least one of the local cell and the neighboring cell according to the configuration information; and in the idle state or the inactive state, measure measurement performance of the specific reference signal in at least one of the neighboring cell and the local cell.

Optionally, the measurement performance may include at least one of: reference signal receiving power (RSRP), reference signal receiving quality (RSRQ), signal to interference and noise ratio (SINR), received signal strength indicator (RSSI) and channel quality indicator (CQI).

Optionally, the configuration information includes at least one of configuration information of the local cell and configuration information of the neighboring cell.

Figure 7:
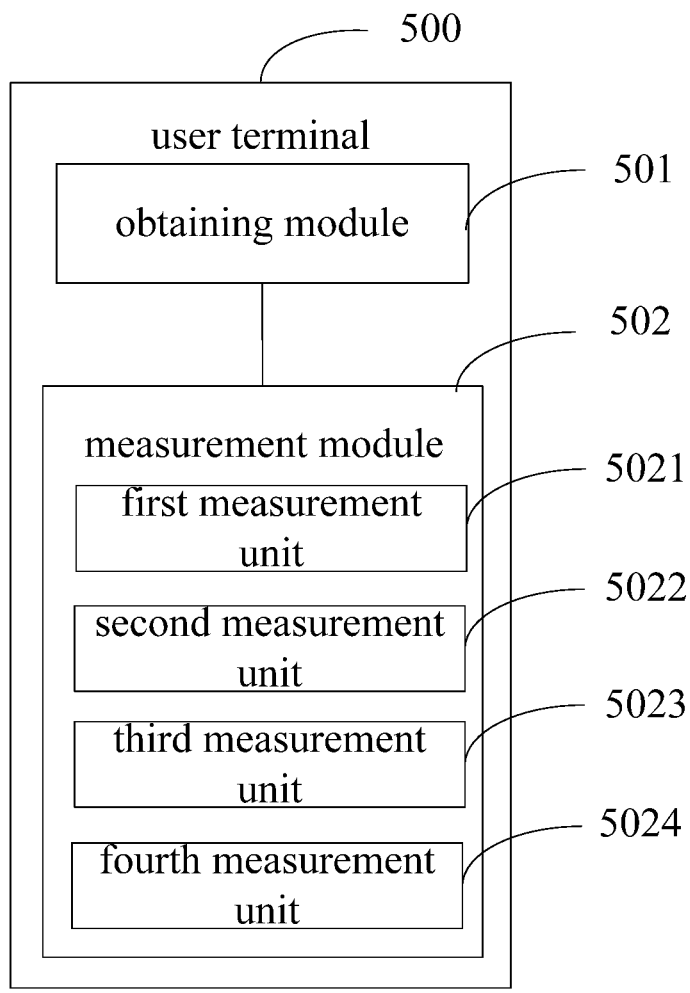
FIG. 7 is another schematic diagram of a user terminal according to an embodiment of the present disclosure.

As shown in FIG. 7, the measurement module 502 includes at least one of the following:

a first measurement unit 5021 configured to, when the configuration information of the local cell exists, in the idle state or the inactive state, measure in the local cell a specific reference signal configured by the configuration information of the local cell;

a second measurement unit 5022 configured to, when the configuration information of the neighboring cell exists, in the idle state or the inactive state, measure in the neighboring cell a specific reference signal configured by the configuration information of the neighboring cell;

a third measurement unit 5023 configured to, when the configuration information of the local cell and the configuration information of the neighboring cell exist and the configuration information of the neighboring cell includes a target specific reference signal that is not in the configuration information of the local cell, measure in the local cell the target specific reference signal;

a fourth measurement unit 5024 configured to, when the configuration information of the neighboring cell exists but the configuration information of the local cell does not exist, measure in the local cell a specific reference signal configured by the configuration information of the neighboring cell.

Optionally, the obtaining module 501 is configured to obtain measurement object information, where the measurement object information includes the configuration information.

Optionally, the measurement module 502 is configured to, in the idle state or the inactive state, measure measurement performance of the specific reference signal in at least one of the neighboring cell and the local cell.

Figure 8:
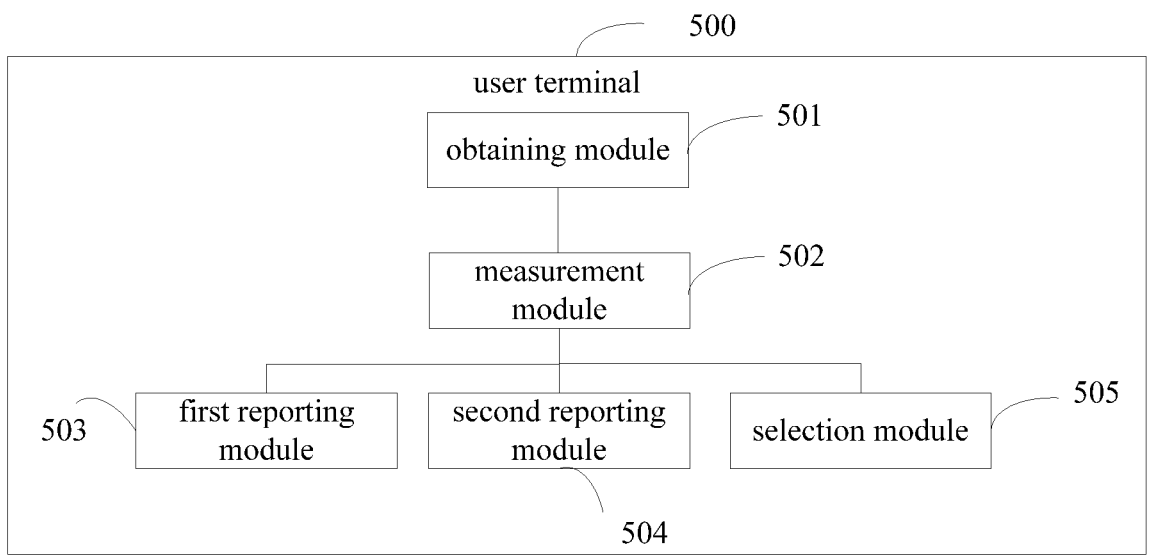
FIG. 8 is another schematic diagram of a user terminal according to an embodiment of the present disclosure.

Optionally, as shown in FIG. 8, the user terminal 500 further includes:

a first reporting module 503 configured to initiate a RACH procedure according to the measurement result of the measuring to enter a connected state, and report the measurement result of the measuring; or, a second reporting module 504 configured to initiate a RACH procedure according to a target event to enter a connected state, and report the measurement result of the measuring or, a selection module 505 configured to, in the idle state or the inactive state, perform cell selection or reselection according to the measurement result of the measuring.

The user terminal provided in the embodiment of the present disclosure can implement various processes implemented by the user terminal in the method embodiments of FIG. 2 and FIG. 3. To avoid repetition, no more details are provided here, and the speed at which the user terminal resumes the connection can be increased.

Figure 9:
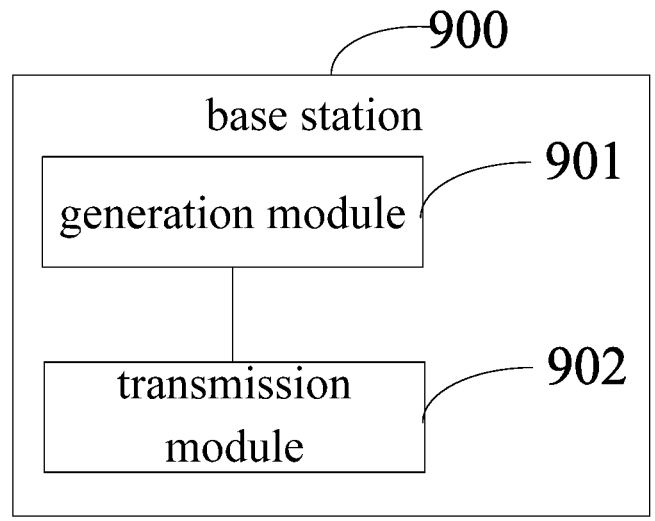
FIG. 9 is a schematic diagram of a base station according to an embodiment of the present disclosure.

Referring to FIG. 9, FIG. 9 is a schematic diagram of a base station according to an embodiment of the present disclosure. As shown in FIG. 9, the base station 900 includes:

a generation module 901 configured to generate configuration information, where the configuration information is configured to configure a specific reference signal;

a transmission module 902 configured to transmit the configuration information to the user terminal, so that the user terminal in an idle state or an inactive state measures the specific reference signal according to the configuration information.

Optionally, the specific reference signal includes at least one of the following: a specific reference signal configured for a local cell and a specific reference signal configured for a neighboring cell.

The specific reference signal configured for the local cell includes at least one of a UE specific reference signal configured for the local cell and a cell specific reference signal configured for the local cell.

The specific reference signal configured for the neighboring cell includes at least one of a UE specific reference signal configured for the neighboring cell and a cell specific reference signal configured for the neighboring cell.

Optionally, the UE specific reference signal includes at least one of the following:

a UE specific SSB, a UE specific channel state information reference signal (CSI-RS), a UE specific demodulation reference signal (DMRS), and other UE specific reference signals.

Figure 10:
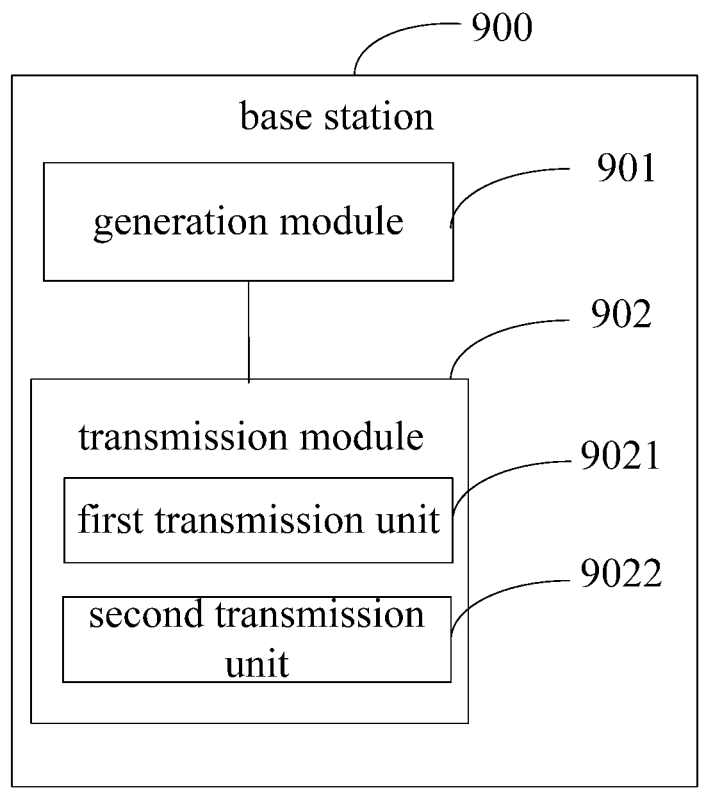
FIG. 10 is another schematic diagram of a base station according to an embodiment of the present disclosure.

Optionally, as shown in FIG. 10, the transmission module 902 includes at least one of the following:

a first transmission unit 9021 configured to transmit the configuration information to the user terminal through an RRC message;

a second transmission unit 9022 configured to transmit the configuration information to the user terminal through a broadcast message.

Optionally, the RRC message may include:

a release message, a suspend message, a reconfiguration message, a configuration message in a connected state, a downlink message in random access channel (RACH) procedure, or a dedicated RRC message scrambled by radio network temporary identifier (RNTI); or, the broadcast message may include an identifier of the user terminal or an identifier of a group in which the user terminal is located.

Optionally, the configuration information is further configured to configure measurement performance, so that the user terminal determines measurement performance of at least one of the local cell and the neighboring cell according to the configuration information, and the user terminal in the idle state or the inactive state measures the measurement performance of the specific reference signal in at least one of the neighboring cell and the local cell.

Optionally, the measurement performance includes at least one of RSRP, RSRQ, SINR, RSSI, and CQI.

Optionally, the transmission module 902 is configured to transmit measurement object information to the user terminal, where the measurement object information includes the configuration information.

Figure 11:
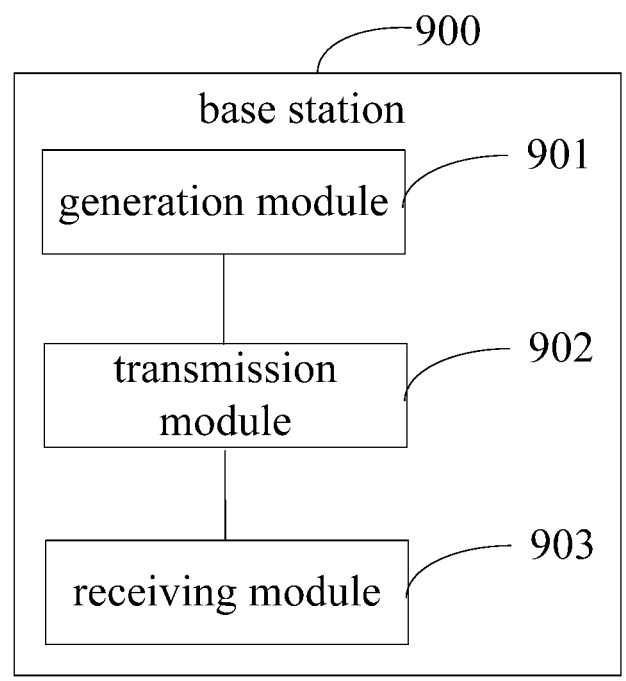
FIG. 11 is another schematic diagram of a base station according to an embodiment of the present disclosure.

Optionally, as shown in FIG. 11, the base station 900 further includes:

a receiving module 903 configured to receive a measurement result of the measuring reported by the user terminal in the connected state.

The base station provided in the embodiment of the present disclosure can implement various processes implemented by the base station in the method embodiment of FIG. 4, and to avoid repetition, details are not described herein. The communication performance of the communication system can be improved.

Figure 12:
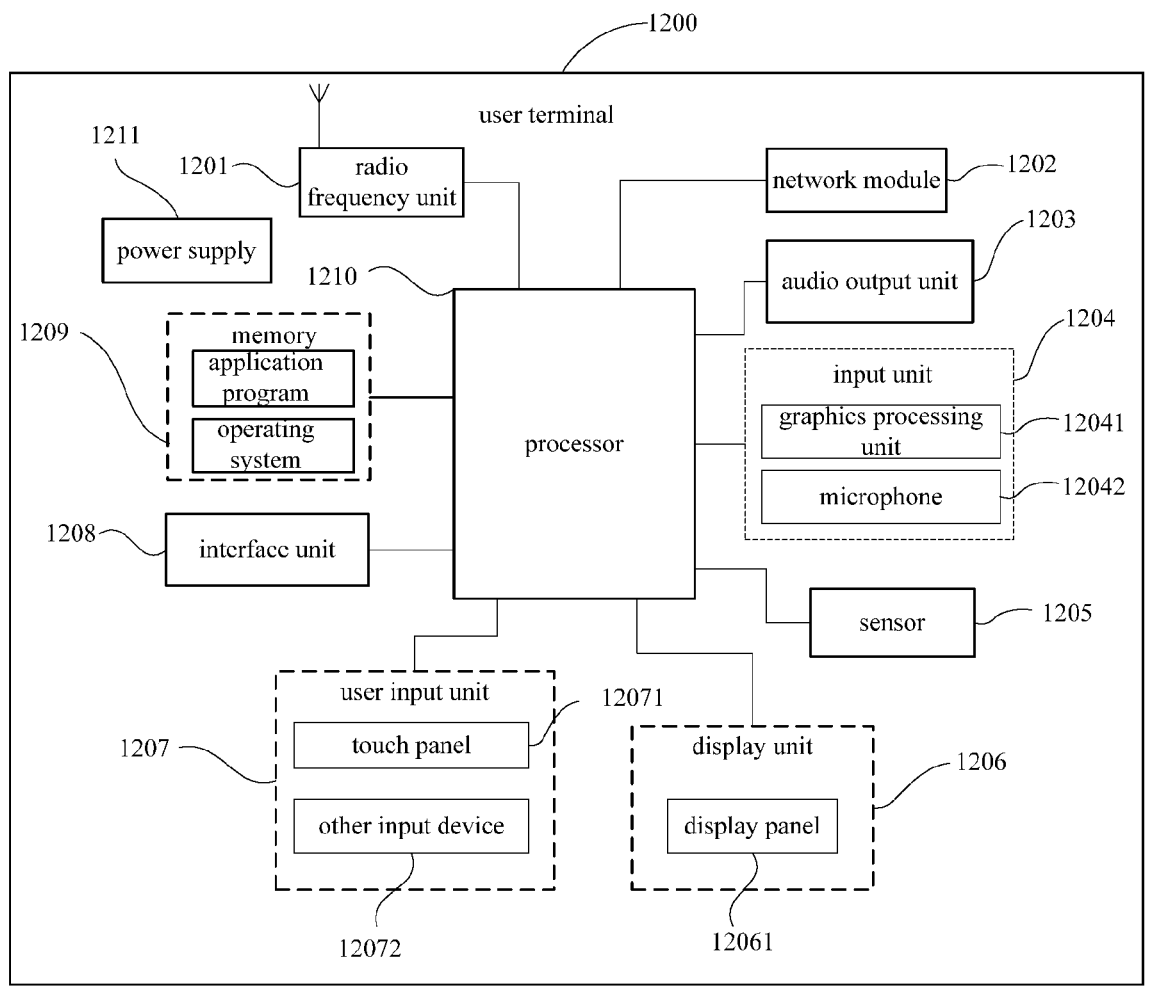
FIG. 12 is another schematic diagram of a user terminal according to an embodiment of the present disclosure.

FIG. 12 is a schematic diagram of a hardware structure of a user terminal implementing various embodiments of the present disclosure. The user terminal 1200 includes, but is not limited to, a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. It will be appreciated by those skilled in the art that structures of the user terminal shown in FIG. 7 do not constitute a limitation of a user terminal, which may include more or fewer components than illustrated, or have some components combined, or different component arrangements. In one embodiment of the present disclosure, the user terminal includes, but is not limited to, a mobile phone, a tablet computer, a notebook computer, a palmtop computer, an in-vehicle terminal, a wearable device, a pedometer, and the like.

The radio frequency unit 1201 is configured to obtain configuration information, where the configuration information is configured to configure a specific reference signal;

in an idle state or an inactive state, measure the specific reference signal according to the configuration information.

Optionally, the specific reference signal includes at least one of the following: a specific reference signal configured for a local cell and a specific reference signal configured for a neighboring cell.

The specific reference signal configured for the local cell includes at least one of a UE specific reference signal configured for the local cell and a cell specific reference signal configured for the local cell.

The specific reference signal configured for the neighboring cell includes at least one of a UE specific reference signal configured for the neighboring cell and a cell specific reference signal configured for the neighboring cell.

Optionally, the UE specific reference signal includes at least one of the following:

a UE specific SSB, a UE specific channel state information reference signal (CSI-RS), a UE specific demodulation reference signal (DMRS), and other UE specific reference signals.

Optionally, the radio frequency unit 1201 is configured to obtain the configuration information in a way including at least one of the following:

receiving configuration information that is transmitted by a base station of a local cell through a radio resource control (RRC) message;

receiving configuration information that is transmitted by the base station of the local cell by a broadcast message; and receiving configuration information that is transmitted by a base station of a neighboring cell by a broadcast message.

Optionally, the RRC message may include:

a release message, a suspend message, a reconfiguration message, a configuration message in a connected state, a downlink message in random access channel (RACH) procedure, or a dedicated RRC message scrambled by radio network temporary identifier (RNTI).

The broadcast message may include an identifier of the user terminal or an identifier of a group in which the user terminal is located.

Optionally, the radio frequency unit 1201 is configured to obtain the configuration information in a way including:

in an inactive state, obtaining configuration information that is received by the user terminal in a connected state; or, in an idle state, obtaining configuration information that is received by the user terminal in the inactive state or the connected state.

Optionally, the configuration information is further configured to configure measurement performance.

The radio frequency unit 1201 is configured to, in the idle state or the inactive state, measure the specific reference signal according to the configuration information, in a way including:

determining measurement performance of at least one of the local cell and the neighboring cell according to the configuration information; and in the idle state or the inactive state, measuring measurement performance of the specific reference signal in at least one of the neighboring cell and the local cell.

Optionally, the measurement performance may include at least one of: reference signal receiving power (RSRP), reference signal receiving quality (RSRQ), signal to interference and noise ratio (SINR), received signal strength indicator (RSSI) and channel quality indicator (CQI).

Optionally, the configuration information includes at least one of configuration information of the local cell and configuration information of the neighboring cell.

The radio frequency unit 1201 is configured to, in the idle state or the inactive state, measure the specific reference signal according to the configuration information, in a way including at least one of the following:

when the configuration information of the local cell exists, in the idle state or the inactive state, measuring in the local cell a specific reference signal configured by the configuration information of the local cell;

when the configuration information of the neighboring cell exists, in the idle state or the inactive state, measuring in the neighboring cell a specific reference signal configured by the configuration information of the neighboring cell;

when the configuration information of the local cell and the configuration information of the neighboring cell exist and the configuration information of the neighboring cell includes a target specific reference signal that is not in the configuration information of the local cell, measuring in the local cell the target specific reference signal;

when the configuration information of the neighboring cell exists but the configuration information of the local cell does not exist, measuring in the local cell a specific reference signal configured by the configuration information of the neighboring cell.

Optionally, the radio frequency unit 1201 is configured to obtain the configuration information in a way including:

obtaining measurement object information, where the measurement object information includes the configuration information.

The radio frequency unit 1201 is configured to, in the idle state or the inactive state, measure the specific reference signal according to the configuration information, in a way including:

in the idle state or the inactive state, measuring measurement performance of the specific reference signal in at least one of the neighboring cell and the local cell.

Optionally, in the idle state or the inactive state, after the specific reference signal is measured according to the configuration information, the radio frequency unit 1201 or the processor 1210 is further configured to, initiate a RACH procedure according to the measurement result of the measuring to enter a connected state, and report the measurement result of the measuring; or, initiate a RACH procedure according to a target event to enter a connected state, and report the measurement result of the measuring or, in the idle state or the inactive state, perform cell selection or reselection according to the measurement result of the measuring.

The user terminal can increase the speed of resuming the connection.

It should be understood that in some embodiments of the present disclosure, the radio frequency unit 1201 may be used to receive and transmit signals during receiving and transmitting information or a call. Specifically, the radio frequency unit 1201 receives downlink data from a base station and then transmits the downlink data to the processor 1210 for processing. Uplink data is transmitted to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may also communicate with the network and other devices through a wireless communication system.

The user terminal provides wireless broadband internet access to the user through the network module 1202, such as assisting the user in receiving and transmitting email, browsing web pages, and accessing streaming media.

The audio output unit 1203 may convert the audio data received by the radio frequency unit 1201 or the network module 1202 or stored in the memory 1209 into an audio signal and output as sound. Moreover, the audio output unit 1203 may also provide audio output (e.g., call signal reception sound, message reception sound, etc.) related to a specific function performed by the user terminal 1200. The audio output unit 1203 includes a speaker, a buzzer, a receiver, and the like.

The input unit 1204 is used for receiving an audio or video signal. The input unit 1204 may include a Graphics Processing Unit (GPU) 12041 and a microphone 12042. The GPU 12041 processes image data of static pictures or videos obtained by an image capturing apparatus (such as a camera) in a video capturing mode or an image capturing mode. The processed image frame may be displayed on the display unit 1206. The image frames processed by the graphics processor 12041 may be stored in the memory 1209 (or other storage medium) or transmitted via the radio frequency unit 1201 or the network module 1202. The microphone 12042 can receive sound and can process such sound into audio data. The processed audio data may be converted into a format output that may be transmitted to the mobile communication base station via the radio frequency unit 1201 in the case of a telephone talk mode.

The user terminal 1200 further includes at least one sensor 1205, such as a light sensor, a motion sensor, and other sensors. Specifically, the light sensor includes an ambient light sensor and a proximity sensor. The ambient light sensor can adjust brightness of a display panel 12061 according to the brightness of the ambient light. The proximity sensor can turn off the display panel 12061 and/or backlight when the user terminal 1200 moves to the ear. As one of the motion sensors, an accelerometer sensor can detect the magnitude of the acceleration in each direction (generally three axes), can detect the magnitude and direction of the gravity when stationary, and can be used to identify the attitude of the user terminal (such as horizontal/vertical screen switching, related games, magnetometer attitude calibration), vibration identification related functions (such as pedometer, knocking), and the like. The sensor 1205 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 1206 is used to display information input by or provided to the user. The display unit 1206 may include a display panel 12061, which may be configured in the form of a Liquid Crystal Display (LCD), an Organic Light-Emitting Diode (OLED), or the like.

The user input unit 1207 may be used to receive the input number or character information, and to generate a key signal input related to the user setting and the function control of the user terminal. Specifically, the user input unit 1207 includes a touch panel 12071 and other input devices 12072. The touch panel 12071, also referred to as a touch screen, may collect touch operations on or near the touch panel (e.g., operations on or near the touch panel 12071 using any suitable object or accessory, such as a finger, stylus, or the like). The touch panel 12071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 1210, receives commands from the processor 1210 and execute them. In addition, the touch panel 12071 may be implemented in various types such as a resistive type, a capacitive type, an infrared ray, and a surface acoustic wave. In addition to the touch panel 12071, the user input unit 1207 may further include other input devices 12072. Specifically, other input devices 12072 may include, but are not limited to, a physical keyboard, a function key (such as a volume control key, an on-off key), a trackball, a mouse, and a joystick, which will not be elaborated herein.

Further, the touch panel 12071 may be overlaid on the display panel 12061. When the touch panel 12071 detects a touch operation on or near the touch panel, the touch panel 12071 transmits it to the processor 1210 to determine a type of a touch event. Then, the processor 1210 provides a corresponding visual output on the display panel 12061 according to the type of the touch event. Although in FIG. 12, the touch panel 12071 and the display panel 12061 are implemented as two separate components to implement the input and output functions of the user terminal, in some embodiments, the touch panel 12071 and the display panel 12061 may be integrated to implement the input and output functions of the user terminal, which are not specifically limited herein.

The interface unit 1208 is an interface through which an external device is connected to the user terminal 1200. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 1208 may be used to receive input (e.g., data information, power, etc.) from the external device and transmit the received input to one or more elements within the user terminal 1200 or may be used to transmit data between the user terminal 1200 and the external device.

The memory 1209 may be used to store software programs and various data. The memory 1209 may mainly include a program storage area and a data storage area. The program storage area may store an operating system, an application program (such as a sound play function, an image play function) required by at least one function, and the like. The data storage area may store data (such as audio data, a phone book) created according to use of the user terminal. In addition, the memory 1209 may include high speed random access memory, and may also include non-volatile memory, such as at least one magnetic disk storage device, flash memory device, or other volatile solid state storage device.

The processor 1210 is a control center of the user terminal, connects various parts of the entire user terminal by various interfaces and lines, executes various functions of the user terminal and processes data by running or executing software programs and/or modules stored in the memory 1209 and invoking data stored in the memory 1209, thereby performing overall monitoring of the user terminal. The processor 1210 may include one or more processing units. Optionally, the processor 1210 may integrate an application processor and a modem processor. The application processor primarily processes the operating system, the user interface and the application program. The modem processor primarily processes wireless communications. It will be appreciated that the modem processor may also not be integrated into the processor 1210.

The user terminal 1200 may further include a power source 1211 (such as a battery) that supplies power to the various components. Optionally, the power source 1211 may be logically connected to the processor 1210 through a power management system to perform functions such as managing charging, discharging, and power consumption management through the power management system.

In addition, the user terminal 1200 includes functional modules not shown, which will not be elaborated herein.

Optionally, one embodiment of the present disclosure further provides a user terminal including a processor 1210, a memory 1209, and a computer program stored in the memory 1209 and executable on the processor 1210. When the computer program is executed by the processor 1210, each of the processes in the reference signal measurement method of the above embodiment is implemented, and the same technical effect can be achieved. To avoid repetition, details are not described herein.

Figure 13:
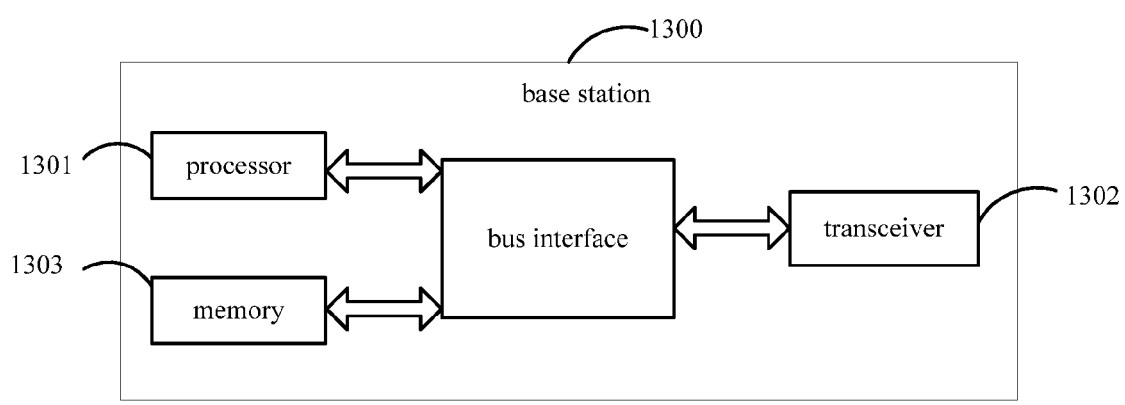
FIG. 13 is another schematic diagram of a base station according to an embodiment of the present disclosure.

Referring to FIG. 13, FIG. 13 is another schematic diagram of a network device according to an embodiment of the present disclosure. As shown in FIG. 13, the network device 1300 includes: a processor 1301, a transceiver 1302, a memory 1303 and a bus interface.

The processor 1301 is configured to generate configuration information, where the configuration information is configured to configure a specific reference signal.

The transceiver 1302 is configured to transmit the configuration information to the user terminal, so that the user terminal in an idle state or an inactive state measures the specific reference signal according to the configuration information.

Optionally, the specific reference signal includes at least one of the following: a specific reference signal configured for a local cell and a specific reference signal configured for a neighboring cell.

The specific reference signal configured for the local cell includes at least one of a UE specific reference signal configured for the local cell and a cell specific reference signal configured for the local cell.

The specific reference signal configured for the neighboring cell includes at least one of a UE specific reference signal configured for the neighboring cell and a cell specific reference signal configured for the neighboring cell.

Optionally, the UE specific reference signal includes at least one of the following:

a UE specific SSB, a UE specific channel state information reference signal (CSI-RS), a UE specific demodulation reference signal (DMRS), and other UE specific reference signals.

Optionally, the transceiver 1302 is configured to transmit the configuration information to the user terminal in a way including at least one of the following:

transmitting the configuration information to the user terminal through an RRC message;

transmitting the configuration information to the user terminal through a broadcast message.

Optionally, the RRC message may include:

a release message, a suspend message, a reconfiguration message, a configuration message in a connected state, a downlink message in random access channel (RACH) procedure, or a dedicated RRC message scrambled by radio network temporary identifier (RNTI); or, the broadcast message may include an identifier of the user terminal or an identifier of a group in which the user terminal is located.

Optionally, the configuration information is further configured to configure measurement performance, so that the user terminal determines measurement performance of at least one of the local cell and the neighboring cell according to the configuration information, and the user terminal in the idle state or the inactive state measures the measurement performance of the specific reference signal in at least one of the neighboring cell and the local cell.

Optionally, the measurement performance includes at least one of RSRP, RSRQ, SINR, RSSI, and CQI.

Optionally, the transceiver 1302 is configured to transmit the configuration information to the user terminal in a way including at least one of the following:

transmitting measurement object information to the user terminal, where the measurement object information includes the configuration information.

Optionally, after transmitting the configuration information to the user terminal, the transceiver 1302 is further configured to receive a measurement result of the measuring reported by the user terminal in the connected state.

The network device 1300 can improve the speed at which the user terminal resumes the connection.

The transceiver 1302 is configured to receive and transmit data under control of processor 1301. The transceiver 1302 includes at least two antenna ports.

In FIG. 13, the bus architecture may include any number of interconnected buses and bridges. Specifically, various circuits of one or more processors, which are represented by the processor 1301, and the storage, which is represented by the memory 1303, are linked together. The bus architecture may link various other circuits, such as a peripheral device, voltage regulator and a power management circuit together. These features are well known in this field, therefore, this disclosure does not make further description on these features. The bus interface provides an interface. The transceiver 1302 may be multiple elements, including a transmitter and a receiver and provide units, which communicate with other devices on the transmission medium. For different UEs, a user interface 1304 may also be an interface capable of externally/internally connecting required devices which may include a keyboard, a monitor, a speaker, microphone, joystick.

The processor 1301 is responsible for managing the bus architecture and common processing and the memory 1303 may store data used by the processor 1301 when executing the operations.

Optionally, one embodiment of the present disclosure further provides a network device including a processor 1301, a memory 1303, and a computer program stored in the memory 1303 and executable on the processor 1301. When the computer program is executed by the processor 1301, each of the processes in the reference signal measurement method of the above embodiment is implemented, and the same technical effect can be achieved. To avoid repetition, details are not described herein.

One embodiment of the present disclosure further provides a computer readable storage medium including a computer program stored thereon. The computer program is executed by a processor to implement each process of the reference signal measurement method at the user terminal, or the computer program is executed by a processor to implement each process of the reference signal measurement method at the network device, and the same technical effect can be achieved. To avoid repetition, details are not described herein. The computer readable storage medium may be, such as a read-only memory (ROM), a random access memory (RAM), a magnetic disk, or an optical disk.

It should also be noted that in the present disclosure, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

Through the description of the above embodiments, those skilled in the art can clearly understand that the methods in the above embodiments may be implemented by means of software plus a necessary general hardware platform, and of course, may also be implemented by hardware, but in many cases the former is better implementation. Based on such an understanding, the technical solution of the present disclosure in essence, or a part that contributes to related technologies, may be embodied in the form of a software product. The computer software product may be stored in a storage medium (such as ROM/RAM, magnetic disk, optical disk), and includes multiple instructions to enable a terminal (which may be a mobile phone, a computer, a server, an air conditioner, or a network device, etc.) to execute the method described in various embodiments of the present disclosure.

The embodiments of the present disclosure have been described above with reference to the drawings, but the present disclosure is not limited to the specific embodiments described above, and the specific embodiments described above are merely illustrative and not restrictive. In the light of the present disclosure, those skilled in the art may make many variations without departing from the sprit and the protection scope of the claims, which fall within the protection of the present disclosure.

What is claimed is:

1. A reference signal measurement method, applied to a user terminal, comprising:

obtaining configuration information, wherein the configuration information is configured to configure a specific reference signal;

measuring the specific reference signal according to the configuration information in an idle state or an inactive state;

wherein the configuration information comprises at least one of configuration information of a local cell and configuration information of a neighboring cell;

wherein the measuring the specific reference signal according to the configuration information in an idle state or an inactive state, comprises:

when the configuration information of the local cell exists, in the idle state or the inactive state, measuring in the local cell a specific reference signal configured by the configuration information of the local cell;

when the configuration information of the neighboring cell exists, in the idle state or the inactive state, measuring in the neighboring cell a specific reference signal configured by the configuration information of the neighboring cell;

when the configuration information of the local cell and the configuration information of the neighboring cell exist and the configuration information of the neighboring cell comprises a target specific reference signal that is not in the configuration information of the local cell, measuring in the local cell the target specific reference signal;

when the configuration information of the neighboring cell exists and the configuration information of the local cell does not exist, measuring in the local cell a specific reference signal configured by the configuration information of the neighboring cell.

2. The method according to claim 1, wherein the specific reference signal comprises at least one of:

a specific reference signal configured for a local cell and a specific reference signal configured for a neighboring cell;

wherein the specific reference signal configured for the local cell comprises at least one of a UE specific reference signal configured for the local cell and a cell specific reference signal configured for the local cell;

wherein the specific reference signal configured for the neighboring cell comprises at least one of a UE specific reference signal configured for the neighboring cell and a cell specific reference signal configured for the neighboring cell.

3. The method according to claim 2, wherein the UE specific reference signal comprises at least one of the following:

a UE specific synchronization signal block (SSB), a UE specific channel state information reference signal (CSI-RS), a UE specific demodulation reference signal (DMRS), and other UE specific reference signals.

4. The method according to claim 1, wherein the obtaining configuration information, comprises at least one of the following:

receiving configuration information that is transmitted by a base station of a local cell through a radio resource control (RRC) message;

receiving configuration information that is transmitted by the base station of the local cell by a broadcast message; and receiving configuration information that is transmitted by a base station of a neighboring cell by a broadcast message.

5. The method according to claim 4, wherein the RRC message comprises:

a release message, a suspend message, a reconfiguration message, a configuration message in a connected state, a downlink message in random access channel (RACH) procedure, or a dedicated RRC message scrambled by radio network temporary identifier (RNTI);

wherein the broadcast message comprises an identifier of the user terminal or an identifier of a group in which the user terminal is located.

6. The method according to claim 1, wherein the obtaining configuration information, comprises at least one of the following:

in the inactive state, obtaining configuration information that is received by the user terminal in a connected state; or, in the idle state, obtaining configuration information that is received by the user terminal in the inactive state or the connected state.

7. The method according to claim 1, wherein the configuration information is further configured to configure measurement performance;

wherein the measuring the specific reference signal according to the configuration information in an idle state or an inactive state, comprises:

determining measurement performance of at least one of a local cell and a neighboring cell according to the configuration information; and in the idle state or the inactive state, measuring measurement performance of the specific reference signal in at least one of the neighboring cell and the local cell.

8. The method according to claim 7, wherein the measurement performance comprises at least one of: reference signal receiving power (RSRP), reference signal receiving quality (RSRQ), signal to interference and noise ratio (SINR), received signal strength indicator (RSSI) and channel quality indicator (CQI).

9. The method according to claim 1, wherein the obtaining configuration information, comprises:

obtaining measurement object information, wherein the measurement object information comprises the configuration information.

10. The method according to claim 1, wherein after the measuring the specific reference signal according to the configuration information in an idle state or an inactive state, the method further comprises:

initiating a RACH procedure according to a measurement result of the measuring to enter a connected state, and reporting the measurement result of the measuring; or, initiating the RACH procedure according to a target event to enter the connected state, and reporting the measurement result of the measuring or, in the idle state or the inactive state, performing cell selection or reselection according to the measurement result of the measuring.

11. A non-transitory computer readable storage medium, comprising a computer program stored thereon; wherein the computer program is executed by a processor to implement steps of the reference signal measurement method according to claim 1.

12. A user terminal, comprising: a memory, a processor, and a computer program stored on the memory and executable on the processor; wherein the computer program is executed by the processor to, obtain configuration information, wherein the configuration information is configured to configure a specific reference signal;

measure the specific reference signal according to the configuration information in an idle state or an inactive state;

wherein the configuration information comprises at least one of configuration information of a local cell and configuration information of a neighboring cell;

the processor is configured to implement at least one of the following:

when the configuration information of the local cell exists, in the idle state or the inactive state, measuring in the local cell a specific reference signal configured by the configuration information of the local cell;

when the configuration information of the neighboring cell exists, in the idle state or the inactive state, measuring in the neighboring cell a specific reference signal configured by the configuration information of the neighboring cell;

when the configuration information of the local cell and the configuration information of the neighboring cell exist and the configuration information of the neighboring cell comprises a target specific reference signal that is not in the configuration information of the local cell, measuring in the local cell the target specific reference signal;

when the configuration information of the neighboring cell exists and the configuration information of the local cell does not exist, measuring in the local cell a specific reference signal configured by the configuration information of the neighboring cell.

13. The user terminal according to claim 12, wherein the specific reference signal comprises at least one of:

a specific reference signal configured for a local cell and a specific reference signal configured for a neighboring cell;

wherein the specific reference signal configured for the local cell comprises at least one of a UE specific reference signal configured for the local cell and a cell specific reference signal configured for the local cell;

wherein the specific reference signal configured for the neighboring cell comprises at least one of a UE specific reference signal configured for the neighboring cell and a cell specific reference signal configured for the neighboring cell.

14. The user terminal according to claim 12, wherein the processor is configured to implement at least one of the following:

receiving configuration information that is transmitted by a base station of a local cell through a radio resource control (RRC) message;

receiving configuration information that is transmitted by the base station of the local cell by a broadcast message; and receiving configuration information that is transmitted by a base station of a neighboring cell by a broadcast message.

15. The user terminal according to claim 12, wherein the processor is configured to, in the inactive state, obtain configuration information that is received by the user terminal in a connected state; or, the processor is configured to, in the idle state, obtain configuration information that is received by the user terminal in the inactive state or the connected state.

16. The user terminal according to claim 12, wherein the configuration information is further configured to configure measurement performance;

the processor is configured to determine measurement performance of at least one of a local cell and a neighboring cell according to the configuration information; and in the idle state or the inactive state, measure measurement performance of the specific reference signal in at least one of the neighboring cell and the local cell.

17. The user terminal according to claim 12, wherein the processor is configured to:
   initiate a RACH procedure according to a measurement result of the measuring to enter a connected state, and report the measurement result of the measuring; or,
   initiate the RACH procedure according to a target event to enter the connected state, and report the measurement result of the measuring or,
   in the idle state or the inactive state, perform cell selection or reselection according to the measurement result of the measuring.

* * * * *